United States Patent [19]

Onda

[11] 4,322,105
[45] Mar. 30, 1982

[54] WINDOW DECORATIVE ARRANGEMENT FOR AUTOMOTIVE VEHICLE

[75] Inventor: Kiyoshi Onda, Yokohama, Japan

[73] Assignee: Nissan Motor Company, Limited, Yokohama, Japan

[21] Appl. No.: 107,831

[22] Filed: Dec. 28, 1979

[30] Foreign Application Priority Data

Oct. 1, 1979 [JP] Japan .............................. 54-1981[U]

[51] Int. Cl.³ .............................................. B60J 1/20
[52] U.S. Cl. ......................................... 296/93; 52/213
[58] Field of Search ............... 296/93, 201, 200, 84 R, 296/84 D; 52/213, 214, 400

[56] References Cited

U.S. PATENT DOCUMENTS

| | | | |
|---|---|---|---|
| 2,386,151 | 10/1945 | Trauvetter | 52/213 |
| 3,037,810 | 6/1962 | Kelley | 52/213 |
| 3,078,119 | 2/1963 | Premo et al. | 296/93 |
| 3,276,178 | 10/1966 | Letourneur et al. | 52/400 |
| 3,474,586 | 10/1969 | Hoverman, Jr. | 52/400 |

Primary Examiner—Joseph F. Peters, Jr.
Assistant Examiner—Ross Weaver
Attorney, Agent, or Firm—Schwartz, Jeffery, Schwaab, Mack, Blumenthal & Koch

[57] ABSTRACT

A window decorative arrangement for an automotive vehicle, comprising a weather strip fixedly holding a window glass to the vehicle body structure and a metal molding longitudinally extending along the weather strip and securely attached to the vehicle body structure, wherein the molding has a marginal portion securely attached to the vehicle body structure and longitudinally extending in close proximity to the outer perimeter of the weather strip and wherein the weather strip has a longitudinal lug portion outwardly spaced apart from the marginal portion of the molding for concealing the marginal portion of the molding behind the lug portion.

8 Claims, 7 Drawing Figures

WINDOW DECORATIVE ARRANGEMENT FOR AUTOMOTIVE VEHICLE

FIELD OF THE INVENTION

The present invention relates generally to body structures of automotive vehicles and particularly to a window decorative arrangement for a body structure of an automotive vehicle. More particularly, the present invention is concerned with a window decorative arrangement for an automotive vehicle body structure having a window glass panel fixedly fitted by a weather strip and garnished by a decorative metal molding.

BACKGROUND OF THE INVENTION

Windows such as front windows, rear windows and rear quarter windows of automotive vehicles are usually fixed to the vehicle body structures by means of flexible weather strips and garnished by decorative metal moldings extending along the outer perimeters of the weather strips. In the case of a vehicle body structure having a drip channel extending along an upper edge portion of a window glass for collecting drips of water from the roof panel, a window decorative molding is attached to the vehicle body structure by means of the drip channel. If a vehicle body structure has no drip channel, a window decorative molding is attached to the vehicle body structure by means of clips or is formed with a marginal portion fixed to the vehicle body structure by means of, for example, grommets and screws, as is well known in the art. In any of the conventional window decorative arrangements of these natures, the moldings are inevitably spaced apart from the weather strips so that the vehicle body structures are left exposed between the moldings and the weather strips. This will impair the viewer's feeling of unity between the weather strip and the molding and will accordingly degrade the external appearance of the body structure as a whole. Furthermore, the existence of the spacing between the molding and the weather strip gives rise to an increase in the aggregated width of the two members and is objectionable when it is desired to enlarge the window the purpose of providing a wider range of view through the window.

An object of the present invention is to provide an improved window decorative arrangement which is free from these drawbacks of prior-art window decorative arrangements for automotive vehicle body structures and which features a combination of a weather strip and a window decorative molding arranged in such a manner as to eliminate or at least minimize the spacing between the weather strip and the molding.

SUMMARY OF THE INVENTION

In accordance with the present invention, there is provided a decorative arrangement for an automotive vehicle body structure having a window glass fixedly fitted thereto, comprising a flexible weather strip fixedly holding the window glass to the vehicle body structure and a molding attached to the vehicle body structure and extending along the outer perimeter of the weather strip, wherein the molding has a marginal portion secured to the vehicle body structure along and in close proximity to the outer perimeter of the weather strip and wherein the weather strip has a lug portion extending along the weather strip and arranged to conceal the marginal portion of the weather strip between the lug portion and the vehicle body structure.

BRIEF DESCRIPTION OF THE DRAWINGS

The features and advantages of a window decorative arrangement according to the present invention over prior-art arrangements for automotive vehicle body structures will be more clearly appreciated from the following description taken in conjunction with the accompanying drawings in which like reference numerals designate similar or corresponding members and structures and in which.

DETAILED DESCRIPTION OF THE PRIOR ART

Figure 1:
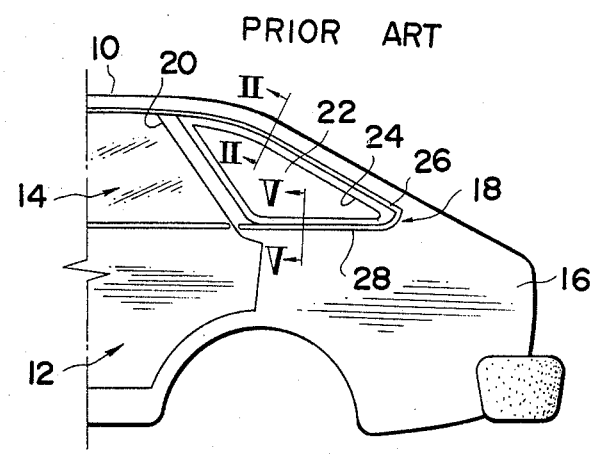
FIG. 1 is a side elevation view showing a rear half of the body structure of an automotive vehicle.

In FIG. 1, there is shown a rear half portion of the vehicle body structure of an automotive vehicle of, for example, the four-door sedan or hardtop type including a roof panel 10, a rear door assembly 12 having a rear side window 14, and a rear fender panel 16 arranged with a rear-quarter or "opera" window 18 adjacent the rear side window 14 across a rear piller 20. The rear-quarter window 18 is comprised of a window glass 22 fixedly secured to the rear fender panel 16 by means of a flexible weather strip 24 attached to the rear fender panel 16 and having the window glass 22 listed by the weather strip so that the window glass 22 is fixed to the vehicle body structure. The weather strip 24 is surrounded by metal moldings which consist of a drip molding 26 extending along a slanting upper portion of the weather strip 24 and a waist molding 28 extending along a lower portion of the weather strip 22.

As illustrated to an enlarged scale in each of FIGS. 2 to 5, the weather strip 24 has two grooved strip portions, one of which has seized therein an edge portion of the window glass 22 and the other of which has seized therein an edge portion of the rear fender panel 16 as well as an edge portion of a rear side panel 30 welded or otherwise securely attached along its edge portion to the edge portion of the rear fender panel 16. The rear side panel 30 constitutes an inner structural member of a rear side portion of the vehicle body structure which is largely composed of the rear fender panel 16 and the rear side panel 30. Designated by reference numeral 32 is a lining attached to the rear side panel 30.

Figure 2:
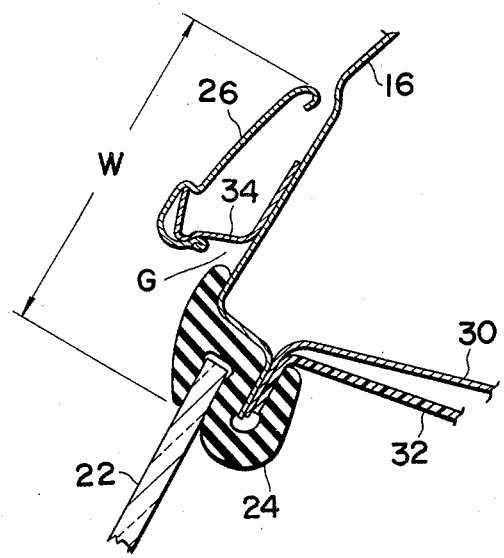
FIG. 2 is a cross sectional view taken along line II—II in FIG. 1 and shows an example of prior-art window decorative arrangements for automotive vehicle body structures.

In the construction illustrated in FIG. 2, the vehicle body structure has securely attached to the outer face of the rear fender panel 16 a drip channel member 34 longitudinally extending along and immediately above the slanting upper portion (FIG. 1) of the weather strip 24. The drip channel member 34 is formed with a groove throughout its length and is adapted to collect rain which will drip from the roof panel 10 (FIG. 1) as is well known in the art. In the case of the vehicle body structure thus provided with the drip channel member 34 above the weather strip 24, the drip molding 26 is usually attached to the drip channel member 34 in such a manner as to extend along the upper end of the weather strip 24.

Figure 3:
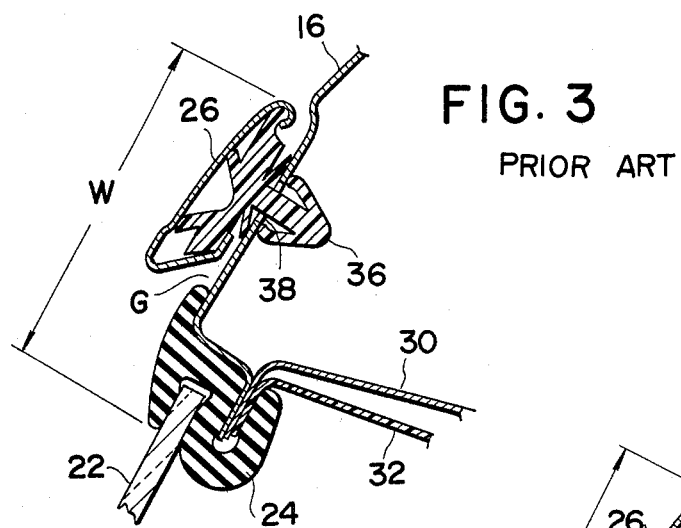
FIG. 3 is a view similar to FIG. 2 but shows another example of prior-art window decorative arrangements for automotive vehicle body structures.
Figure 4:
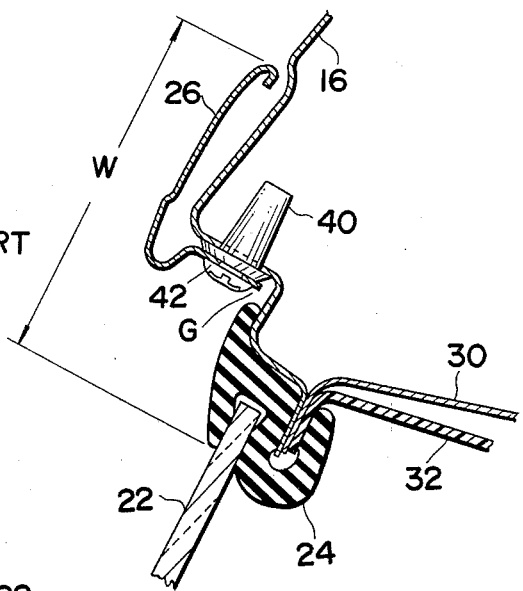
FIG. 4 is a view also similar to FIG. 2 but shows still another example of prior-art window decorative arrangements for automotive vehicle body structures.

In a vehicle body structure which is not provided with such a drip channel member, the drip molding 26 is attached to the rear fender panel 16 by means of clip fasteners 36 press fitted to the fender panel 16 through openings 36 formed in the panel 16 as illustrated in FIG. 3 or is formed with a marginal portion attached to the rear fender panel 16 by means of grommets 40 and screws 42 screwed into the grommets 40 as shown in FIG. 4.

Figure 5:
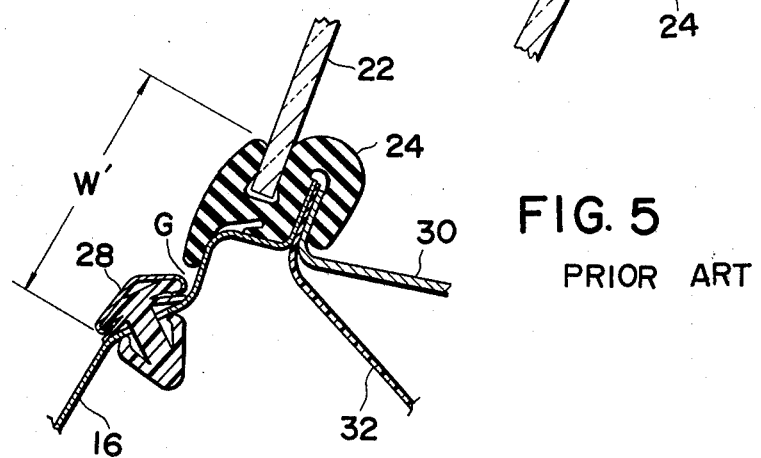
FIG. 5 is a cross-sectional view taken along line V—V in FIG. 1 and shows still another example of prior-art window decorative arrangements for automotive vehicle body structures.

On the other hand, the waist molding 28 is usually attached to the rear fender panel 16 by means of clip fasteners 44 which are press fitted to the fender panel 16 through openings 46 formed in the fender panel 16 as shown in FIG. 5.

In each of the prior-art window decorative arrangements illustrated in FIGS. 2 to 5, the molding 26 or 28 attahced to the rear fender panel 16 is spaced apart from the outer perimeter of the weather strip 24 and, thus, forms an elongated gap G between the weather strip 24 and the molding 26 or 28. The external surface of the rear fender panel 16 is therefore exposed to the outside through this gap G and, in effect, gives the viewer of the vehicle body structure an impression that the weather strip 24 and the molding 26 or 28 are structurally separate from each other. Furthermore, the existence of the gap G between the weather strip 24 and the molding 26 or 28 gives rise to an increase in the aggregated width W of the weather strip 24 and the drip molding 26 (FIGS. 2 to 4) or the aggregated width W' of the weather strip 24 and the waist molding 28 (FIG. 5). This is objectionable in designing the vehicle body structure especially when it is desired to enlarge the size of the window 18 (FIG. 1) to provide a wider range of view through the window as previously pointed out.

DESCRIPTION OF THE PREFERRED EMBODIMENTS

Figure 6:
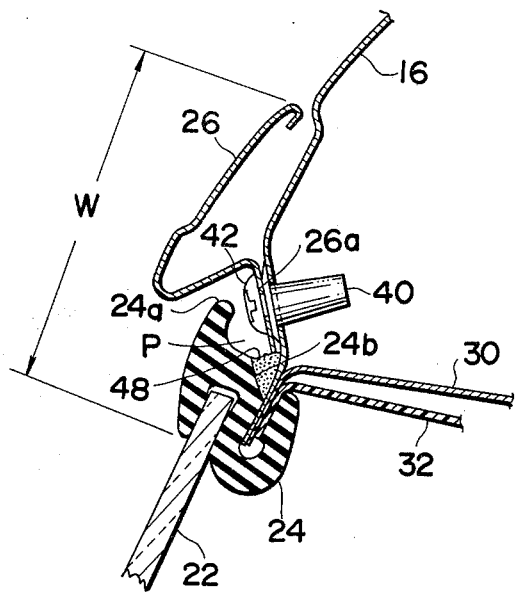
FIG. 6 is a cross sectional view showing a preferred embodiment of a window decorative arrangement according to the present invention, the cross sectional view of FIG. 6 being taken on a section corresponding to the cross section taken along the line II—II in FIG. 1.
Figure 7:
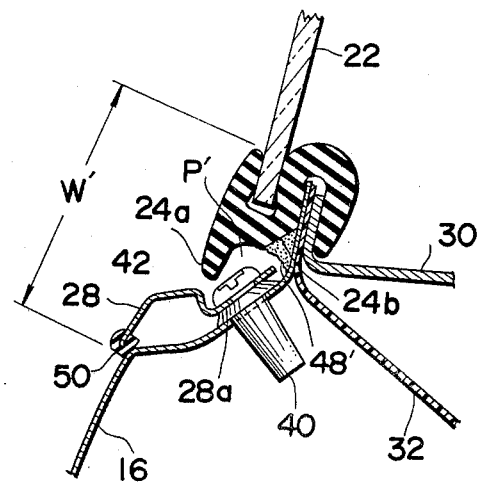
FIG. 7 is a cross sectional view showing another preferred embodiment of a window decorative arrangement according to the present invention, the cross sectional view of FIG. 7 being taken on a section corresponding to the cross section taken on the line V—V in FIG. 1.

FIGS. 6 and 7 show preferred embodiments of a window decorative arrangement according to the present invention to eliminate the above described drawbacks inherent in prior-art decorative arrangements for automotive vehicle body structures. The embodiment shown in FIG. 6 consists of a window decorative arrangement comprising a weather strip 24 and a drip molding 26 and is, thus, an improved version of each of the prior-art arrangements illustrated in FIGS. 2 to 4. On the other hand, the embodiment shown in FIG. 7 consists of a window decorative arrangement comprising a weather strip 24 and a waist molding 28 and is, thus, an improved version of the prior-art arrangement illustrated in FIG. 5.

In the window decorative arrangement illustrated in FIG. 6, the drip molding 26 has a longitudinal marginal portion 26a formed with openings which are arranged longitudinally of the marginal portion 26a. The marginal portion 26a of the drip molding 26 is securely attached to the rear fender panel 16 by suitable fastening means such as, for example, grommets 40 and screws 42 as shown and longitudinally extends along and in close proximity to the outer perimeter of the weather strip 24. The marginal portion 26a to the molding 26 is directed generally downwardly from the remaining portion of the molding 26 so that a drip collecting groove is formed between the remaining portion of the molding 26 and an outer surface portion of the rear fender panel 16. Each of the grommets 40 has a head portion intervening between the rear fender panel 16 and the lower marginal portion 26a of the drip molding 26 and a stem portion projecting inside the fender panel 16 through an opening formed in the panel. The screws 42 are screwed through the above mentioned openings in the marginal portion 26a of the drip molding 26 into the stem portions of the grommets 40 thus configured and have their respective head portions pressed onto the outer face of the marginal portion 26a of the molding 26 so that the rear fender panel 16 and the drip molding 26 are held together with the head portions of the grommets 40 pressed between the marginal portion 26a and the fender panel 16.

Furthermore, the weather strip 24 of the window decorative arrangement illustrated in FIG. 6 has a longitudinal lug portion 24a extending along the marginal portion 26a of the drip molding 26. The lug portion 24a of the weather strip 24 is spaced apart outwardly from the marginal portion 26a of the molding 26 and forms an elongated pocket P between the lug portion 24a and the marginal portion 26a along the molding 26 as shown. The head portions of the screws 42 are accommodated within this pocket P and the marginal portion 26a of the drip molding 26 and accordingly the head portions of the screws 42 are concealed behind the lug portion 24a of the weather strip 24.

If desired, the weather strip 24 may be further formed with a bevelled longitudinal surface portion 24b angled outwardly from the outer face of the edge portion of the rear fender panel 16, forming a longitudinal groove between the surface portion 24b of the weather strip 24 and the edge portion of the rear fender panel 16 as shown. The groove thus formed between the edge portion of the rear fender panel 16 and the surface portion 24b of the weather strip 24 is filled with a body of adhesive sealing compound 48 for bonding the weather strip 24 to the rear fender panel 16 and securing the seal between the weather strip 24 and the edge portion of the rear fender panel 16.

In the window decorative arrangement illustrated in FIG. 7, the waist molding 28 is also formed with a longitudinal marginal portion 28a formed with openings arranged in a longitudinal direction of the marginal portion 28a. The marginal portion 28a of the waist molding 28 is securely attached to the rear fender panel 16 by suitable fastening means such as grommets 40 and screws 42 as shown and longitudinally extends along and in close proximity to the outer perimeter of the weather strip 24. The marginal portion 28a of the waist molding 28 is directed generally upwardly from the remaining portion of the molding 28 which is listed with a bead 50 along the lower end of remaining portion. The grommets 40 and the screws 42 are arranged similarly to their respective counterparts in the arrangement shown in FIG. 6.

The weather strip 24 of the window decorative arrangement illustrated in FIG. 7 also has a longitudinal lug portion 24a extending along the marginal portion 28a of the waist molding 28. The lug portion 24a of the weather strip 24 is spaced apart outwardly from the marginal portion 28a of the molding 28 and forms an elongated pocket P' between the lug portion 24a and the marginal portion 28a along the molding 26 as shown. The head portions of the screws 42 respectively screwed into the grommets 40 through the openings in the marginal portion 28a of the molding 28 are accommodated within this pocket P'. The marginal portion 28a of the waist molding 28 and accordingly the head portions of the screws 42 are thus concealed behind the lug portion 24a of the weather strip 24.

As in the arrangement illustrated in FIG. 6, the weather strip 24 forming part of the window decorative arrangement illustrated in FIG. 7 may be further formed with a bevelled longitudinal surface portion 24b which is angled outwardly from the outer face of the edge portion of the rear fender panel 16. The longitudinal groove thus formed between the outer face of the edge portion of the rear fender panel 16 and the bevelled surface portion 24b of the weather strip 24 is filled with a body of adhesive sealing compound 48' for bonding the weather strip 24 to the rear fender panel 16 and securing the seal between the weather strip 24 and the edge portion of the fender panel 16.

When in screwing the screws 42 into the grommets 40 attached to the rear fender panel 16 and the drip or waist molding 26 or 28, access can be readily allowed by forcibly deforming the lug portion 24a of the weather strip 24 away from the marginal portion 26a or 28a of the molding 26 or 28, respectively.

As will have been appreciated from the foregoing description, the window decorative arrangement proposed by the present invention is characterized, inter alia, in that the lug portion 24a of the weather strip 24 and the marginal portion 26a, or 28a of the molding 26 or 28, respectively, overlap each other and, for this reasons, the combination of the weather strip 24 and the molding 26 or 28 will provide the viewer of the decorative arrangement an impression of unity therebetween. Furthermore, the width w of the combination of the weather strip 24 and the drip molding 26 in the arrangement of FIG. 6 and the width w' of the combination of the weather strip 24 and the waist molding 28 in the arrangement of FIG. 7 are significantly smaller than the aggregated width W of the weather strip 24 and the drip molding 26 in each of the prior-art arrangements of FIGS. 2 to 4 and the aggregated width W' of the weather strip 24 and the waist molding 28 in the prior-art arrangement of FIG. 5. Thus, window decorative arrangement according to the present invention is useful when it is desired to enlarge the size of a window for the purpose of providing a wider range of view through the window.

While it has been described that the present invention is applied to a decorative arrangement for a rear-quarter or opera window of an automotive vehicle, it will be apparent that the features of the present invention can be readily realized not only for such a window but for any other windows such as the windshield, front side windows, rear side windows and rear windshield of an automotive vehicle.

What is claimed is:

1. A window decorative arrangement for an automotive vehicle body structure having a window glass fixedly fitted thereto, comprising, in combination:
   a weather strip fixedly holding the window glass to the vehicle structure, and
   a molding attached to the outer portion of the vehicle body structure and extending along the outer perimeter of the weather strip,
   wherein said molding has a marginal portion secured to the outer portion of the vehicle body structure along and in proximity to the outer perimeter of said weather strip, and
   wherein said weather strip has a lug portion extending along said molding with a small clearance between the top thereof and the outer periphery of said molding and arranged to conceal the marginal portion of said molding behind said lug portion.

2. A window decorative arrangement as set forth in claim 1, in which said weather strip has a bevelled longitudinal surface portion angled outwardly from an outer surface portion of the vehicle body structure and thereby forming an elongated groove between said surface portion of the vehicle body structure and said surface portion of the weather strip, said groove being filled with a body of adhesive sealing compound.

3. A window decorative arrangement as set forth in claim 2, further comprising fastening means for securing said molding to the vehicle body structure, said fastening means comprising a grommet secured to the vehicle body structure and a screw-threaded member screwed into said grommet through an opening in said marginal portion of said molding.

4. A window decorative arrangement as set forth in claim 3, in which said lug portion of said weather strip is spaced apart outwardly from said marginal portion of said molding for forming a pocket between the lug portion and the marginal portion, said screw-threaded member projecting in part into said pocket.

5. A window decorative arrangement for an automotive vehicle body structure having a window glass fixedly fitted thereto, comprising, in combination:
   a weather strip fixedly holding the window glass to a vehicle body outer member; and
   a molding fitted on the vehicle body outer member independent of said weather strip and extending along the weather strip,
   wherein said molding has a cross-section of a substantially S-shaped configuration in which one end section is fitted on the vehicle body outer member; and
   wherein said weather strip includes a leg portion extending over and spaced from said end section of said molding fitted on the vehicle body outer member in an overlapping configuration to cover said end section of said molding fitted on the vehicle body.

6. A window decorative arrangement as set forth in claim 5, in which said weather strip has a bevelled longitudinal surface portion angled outwardly from an outer surface portion of the vehicle body structure and thereby forming an elongated groove between said surface portion of the vehicle body structure and said surface portion of the weather strip, said groove being filled with a body of adhesive sealing compound.

7. A window decorative arrangement as set forth in claim 6, further comprising fastening means for securing said molding to the vehicle body structure, said fastening means comprising a grommet secured to the vehicle body structure and a screw-threaded member screwed into said grommet through an opening in said marginal portion of said molding.

8. A window decorative arrangement as set forth in claim 7, in which said lug portion of said weather strip is spaced apart outwardly from said marginal portion of said molding for forming a pocket between the lug portion and the marginal portion, said screw-threaded member projecting in part into said pocket.

* * * * *